(12) United States Patent
Shim et al.

(10) Patent No.: US 10,578,940 B2
(45) Date of Patent: Mar. 3, 2020

(54) DISPLAY DEVICE

(71) Applicant: Samsung Display Co., Ltd., Yongin-si, Gyeonggi-do (KR)

(72) Inventors: Chan Wook Shim, Asan-si (KR); Jung Hwan Hwang, Cheonan-si (KR); Jae-Jin Song, Hwaseong-si (KR); Kook Hyun Choi, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/852,375

(22) Filed: Dec. 22, 2017

(65) Prior Publication Data
US 2018/0284551 A1    Oct. 4, 2018

(30) Foreign Application Priority Data

Mar. 29, 2017 (KR) .................. 10-2017-0040077

(51) Int. Cl.
*G09G 3/36* (2006.01)
*G02F 1/1362* (2006.01)
(Continued)

(52) U.S. Cl.
CPC ...... *G02F 1/136286* (2013.01); *G02F 1/1343* (2013.01); *G09G 3/3258* (2013.01);
(Continued)

(58) Field of Classification Search
CPC ........................................................ G09G 3/36
See application file for complete search history.

(56) References Cited

U.S. PATENT DOCUMENTS

| 6,373,458 B1* | 4/2002 | Yamakura | G09G 3/3648 345/100 |
| 2007/0164954 A1* | 7/2007 | Yang | G09G 3/3677 345/88 |

(Continued)

FOREIGN PATENT DOCUMENTS

| KR | 1020030058765 | 7/2003 |
| KR | 1020080110124 | 12/2008 |

(Continued)

*Primary Examiner* — Olga V Merkoulova
(74) *Attorney, Agent, or Firm* — Innovation Counsel LLP

(57) ABSTRACT

A display device includes: a display panel in which a plurality of pixels are arranged; a plurality of gate lines disposed in the display panel and transmitting a gate signal to the plurality of pixels; a gate driver disposed in the display panel and including a plurality of stages for generating the gate signal and outputting the gate signal to the plurality of gate lines; and a plurality of clock signal lines disposed in the display panel and transmitting a clock signal to the plurality of stages. Each stage of the plurality of stages includes a clock signal terminal connected to one of the plurality of clock signal lines to receive the clock signal, a first output terminal connected to a corresponding gate line to output the gate signal, and a first transistor and a second transistor connected to the first output terminal. The stages have a substantially same area, and a size of the second transistor of a first stage disposed at an upper portion of the display panel is different from a size of the second transistor of a second stage disposed at a lower portion of the display panel.

20 Claims, 8 Drawing Sheets

(51) Int. Cl.
    *G09G 3/3258*     (2016.01)
    *G02F 1/1343*     (2006.01)
    *G09G 3/3266*     (2016.01)

(52) U.S. Cl.
    CPC ......... *G09G 3/3266* (2013.01); *G09G 3/3677* (2013.01); *G02F 1/1362* (2013.01); *G09G 2300/0426* (2013.01); *G09G 2310/0264* (2013.01); *G09G 2310/0267* (2013.01); *G09G 2310/0281* (2013.01); *G09G 2310/0286* (2013.01)

(56) References Cited

U.S. PATENT DOCUMENTS

| | | | | |
|---|---|---|---|---|
| 2009/0009497 A1* | 1/2009 | Lee | ...................... | G09G 3/3674 345/205 |
| 2009/0021662 A1* | 1/2009 | Chang | ................... | G02F 1/1368 349/46 |
| 2010/0156869 A1* | 6/2010 | Lee | ...................... | G09G 3/3677 345/208 |
| 2010/0220079 A1* | 9/2010 | Bang | .................... | G09G 3/3648 345/204 |
| 2010/0295838 A1* | 11/2010 | Umezaki | ................ | G11C 19/28 345/211 |
| 2014/0319602 A1* | 10/2014 | Vielemeyer | ....... | H01L 29/66477 257/330 |

FOREIGN PATENT DOCUMENTS

| | | |
|---|---|---|
| KR | 1020140122628 | 10/2014 |
| KR | 1020160005859 | 1/2016 |

\* cited by examiner

DISPLAY DEVICE

CROSS-REFERENCE TO RELATED APPLICATION

This application claims priority to and the benefit of Korean Patent Application No. 10-2017-0040077 filed in the Korean Intellectual Property Office on Mar. 29, 2017, the disclosure of which is incorporated herein by reference in its entirety.

BACKGROUND (a) Technical Field

This disclosure relates to a display device.

(b) Description of the Related Art

A display device such as a liquid crystal display (LCD) or an organic light emitting device (OLED) includes a display panel for displaying an image, and a driver such as a gate driver or a data driver for driving the display panel. The driver may be formed as an IC chip, and may be electrically connected to the display panel. Recently, a technique for integrating the gate driver in the display panel instead of forming the same as an IC chip has been under development.

The gate driver includes transistors that are switching elements and capacitors that are storage elements. When the gate driver is integrated in the display panel, the gate driver may be disposed in a peripheral area of the display panel, that is, a non-display area provided outside a display area in which an image is displayed. Signals for generating gate signals including a gate-on voltage and a gate-off voltage are applied to the gate driver, and signal lines for transmitting the signals may be formed in the non-display area.

The gate signals output by the gate driver may experience an RC delay caused by clock signal lines for transmitting clock signals from among the signal lines, and the delay of the gate signals may particularly increase to an upper portion of the display panel from a lower portion of the display panel to which the signals are input. The difference of the delays in the gate signals between the upper portion and the lower portion of the display panel may further increase as the display panel becomes larger and the resolution becomes higher. The delay of the gate signals may reduce a charging time of pixels and may generate cross-talk, thereby deteriorating display quality.

In addition, it is desirable to reduce a width of the peripheral area of the display panel and reduce a width of a bezel of the display device. However, when the gate driver is disposed in the peripheral area of the display panel, a region for forming transistors of the gate driver may be limited.

The above information disclosed in this Background section is only for enhancement of understanding of the background of the present disclosure and therefore it may contain information of a prior art that is already known to a person of ordinary skill in the art.

SUMMARY

The present disclosure provides a display device including a gate driver for reducing a delay of a gate signal depending on a position of a display panel and acquiring operational reliability.

An exemplary embodiment provides a display device including: a display panel in which a plurality of pixels are arranged; a plurality of gate lines disposed in the display panel, and transmitting a gate signal to the plurality of pixels; a gate driver disposed in the display panel, and including a plurality of stages for generating the gate signal and outputting the gate signal to the plurality of gate lines; and a plurality of clock signal lines disposed in the display panel, and transmitting a clock signal to the plurality of stages. Each stage of the plurality of stages includes a clock signal terminal connected to one of the clock signal lines to receive the clock signal, a first output terminal connected to a corresponding gate line to output the gate signal, and a first transistor and a second transistor connected to the first output terminal. The stages have a substantially same area, and a size of the second transistor of a first stage disposed at an upper portion of the display panel is different from a size of the second transistor of a second stage disposed at a lower portion of the display panel.

Another embodiment provides a display device including: a display panel including a display area in which a plurality of pixels and a plurality of gate lines are disposed, and a non-display area adjacent to the display area; a gate driver disposed in the non-display area, and including a plurality of stages connected to each other and respectively connected to the plurality of gate lines; and a plurality of clock signal lines for transmitting a clock signal to the plurality of stages. Each stage includes an output unit including a first transistor that outputs a gate signal, and a pull-down driver including a second transistor that lowers the gate signal to a first low voltage. A size of the second transistor of each stage of the plurality of stages gradually increases from a first end portion of the display panel to a second end portion of the display panel.

According to the exemplary embodiments, the deviation of delays of the gate signals according to the position of the display panel may be improved without modifying the size of the gate driver. Further, a margin of a reliable operation of the gate driver may be achieved. The display device according to the exemplary embodiments may satisfy various requirements such as enlargement, high resolution, and bezel narrowing of the display panel.

DETAILED DESCRIPTION OF THE EMBODIMENTS

Figure 1:
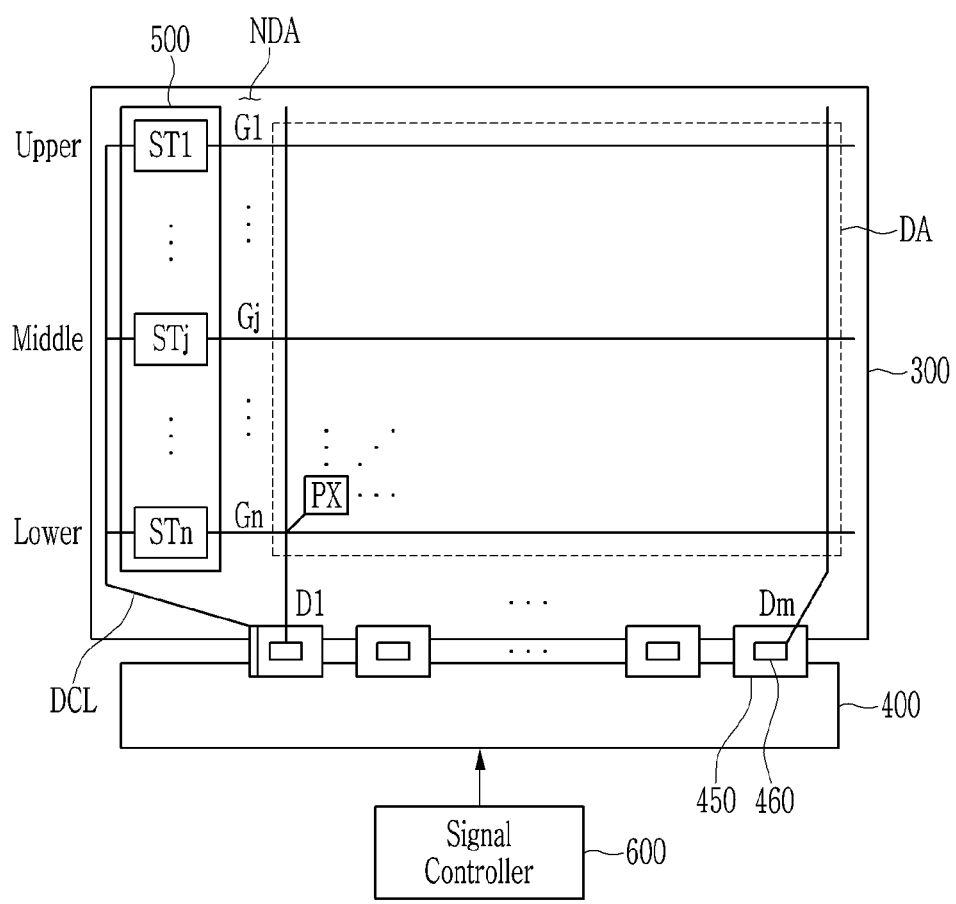
FIG. 1 shows a display device according to an exemplary embodiment of the present disclosure.

In the following detailed description, exemplary embodiments of the present disclosure have been shown and described by way of illustration. As those skilled in the art would realize, the described embodiments may be modified in various different ways without departing from the spirit or scope of the present disclosure.

Like reference numerals designate like elements throughout the specification. In the drawings, the thickness or sizes of respective layers and regions may be enlarged or reduced to clearly illustrate their arrangements and relative positions.

It will be understood that when an element such as a layer, film, region, or substrate is referred to as being "on" another element, it can be directly on the other element or one or more intervening elements may also be present. In contrast, when an element is referred to as being "directly on" another element, there may be no intervening elements present.

In addition, unless explicitly described to the contrary, the word "comprise" and variations such as "comprises" or "comprising" will be understood to imply the inclusion of stated elements but not the exclusion of any other elements.

The phrase "on a plane" means viewing the object portion from the top or the bottom, and the phrase "on a cross-section" means viewing a cross-section of which the object portion is vertically cut from the side.

A display device according to exemplary embodiments of the present disclosure will now be described in detail with reference to accompanying drawings.

FIG. 1 shows a display device according to an exemplary embodiment of the present disclosure.

Referring to FIG. 1, the display device includes a display panel 300, a data driver 460, a gate driver 500, and a signal controller 600.

The display panel 300 includes a display area DA for displaying an image and a non-display area NDA provided near the display area DA. Elements for receiving signals from an external element and displaying an image, and wires, are formed on a substrate on the display panel 300.

Pixels PX for displaying an image are disposed in the display area DA, and gate lines (G1 . . . Gn) and data lines (D1 . . . Dm) for applying signals to the pixels PX are provided in the display area DA. The gate lines (G1 . . . Gn) may cross the data lines (D1 . . . Dm) in an insulated manner.

In the case of a liquid crystal display, each pixel PX includes a transistor, a liquid crystal capacitor, and a storage capacitor. The transistor includes a control electrode (it may also be referred to as a control terminal or a gate electrode) connected to the gate line, a first electrode (it may also be referred to as an input terminal or a source electrode) connected to the data line, and a second electrode (it may also be referred to as an output terminal or a drain electrode) connected to a first electrode of the liquid crystal capacitor and a first electrode of the storage capacitor. A second electrode of the liquid crystal capacitor may be connected to a common electrode to receive a common voltage, and a second electrode of the storage capacitor may receive a storage voltage. In the case of the organic light emitting device, the pixel PX includes at least two transistors including a switching transistor and a driving transistor, at least one storage capacitor, and a light-emitting device (or an organic light emitting diode), and may further include at least one compensation transistor.

The gate driver 500 for applying a gate signal to the gate lines (G1 . . . Gn) is disposed in the non-display area NDA. The gate driver 500 may be integrated in the non-display area NDA. The data driver 460 for applying a data signal (i.e., a data voltage applied to the pixel) to the data lines (D1 . . . Dm) may be an integrated circuit (IC) chip mounted on a flexible printed circuit board (FPCB) 450 bonded to the display panel 300.

The signal controller 600 controls the gate driver 500 and the data driver 460. A printed circuit board (PCB) 400 is positioned on a side of the display panel 300 to transmit the signals from the signal controller 600 to the data driver 460 and the gate driver 500. The signals provided to the gate driver 500 by the signal controller 600 are transmitted through a driver control signal line DCL disposed in the display panel 300. The signals transmitted through the driver control signal line DCL may include signals such as start pulse vertical signals and clock signals, and signals for providing a low voltage at a specific level. A device that is different from the signal controller 600 may transmit the signals through the driver control signal line DCL.

The driver control signal line DCL may be connected to the FPCB 450 and positioned near the gate driver 500. The driver control signal line DCL, for example, may extend in parallel to the gate driver 500 in the non-display area NDA. To avoid complexity of the drawing, the driver control signal line DCL is illustrated as a single line in FIG. 1, and the driver control signal line DCL may include any number of signal lines corresponding to types of signals transmitted to the gate driver 500. The signal lines of the driver control signal line DCL may be provided in parallel to the gate driver 500 outside the gate driver 500 from the display area DA. However, the present disclosure is not limited thereto, for example, a predetermined signal line may be provided between the gate driver 500 and the display area DA, and a predetermined signal line may be provided to pass through the gate driver 500.

The gate driver 500 receives low voltages corresponding to the start pulse vertical signal, the clock signal, and a gate-off voltage through the driver control signal line DCL, generates gate signals including a gate-on voltage and the gate-off voltage, and applies the gate signals to the gate lines (G1 . . . Gn). The gate driver 500 includes stages (ST1 . . . STn) for generating the gate signals and outputting the same. The stages (ST1 . . . STn) are respectively connected to the gate lines (G1 . . . Gn), and the stages (ST1 . . . STn) sequentially output the gate signals to the gate lines (G1 . . . Gn).

The gate driver 500 may be provided to a left side, a right side, an upper side, and/or a lower side of the display area DA. When two gate drivers 500 are disposed at both the right side and the left side of the display area DA, the gate driver disposed at the left side of the display area DA may include odd-numbered stages (ST1, ST3, . . . ) and the gate driver disposed at the right side of the display area DA may include even-numbered stages (ST2, ST4, . . . ), or vice versa. However, when the gate driver 500 is disposed at the right side or the left side of the display area DA, the gate driver 500 may include all stages (ST1 . . . STn).

Each stage may include transistors and at least one capacitor. Each stage may substantially be rectangular, and all stages (ST1 . . . STn) may have a substantially same size (e.g., area). In other words, the sizes of the regions in which the transistors and the capacitor configuring the respective stages (ST1 . . . STn) may correspond to each other on the display panel 300, and the regions may be substantially rectangular. For example, the first stage ST1 and the n-th stage STn, and the j-th stage STj which is an arbitrary stage disposed between the first stage ST1 and the n-th stage STn, may be disposed in substantially the same rectangular region. Therefore, the respective stages are shown as rectangular blocks with the substantially same area and shape in FIG. 1.

Figure 2:
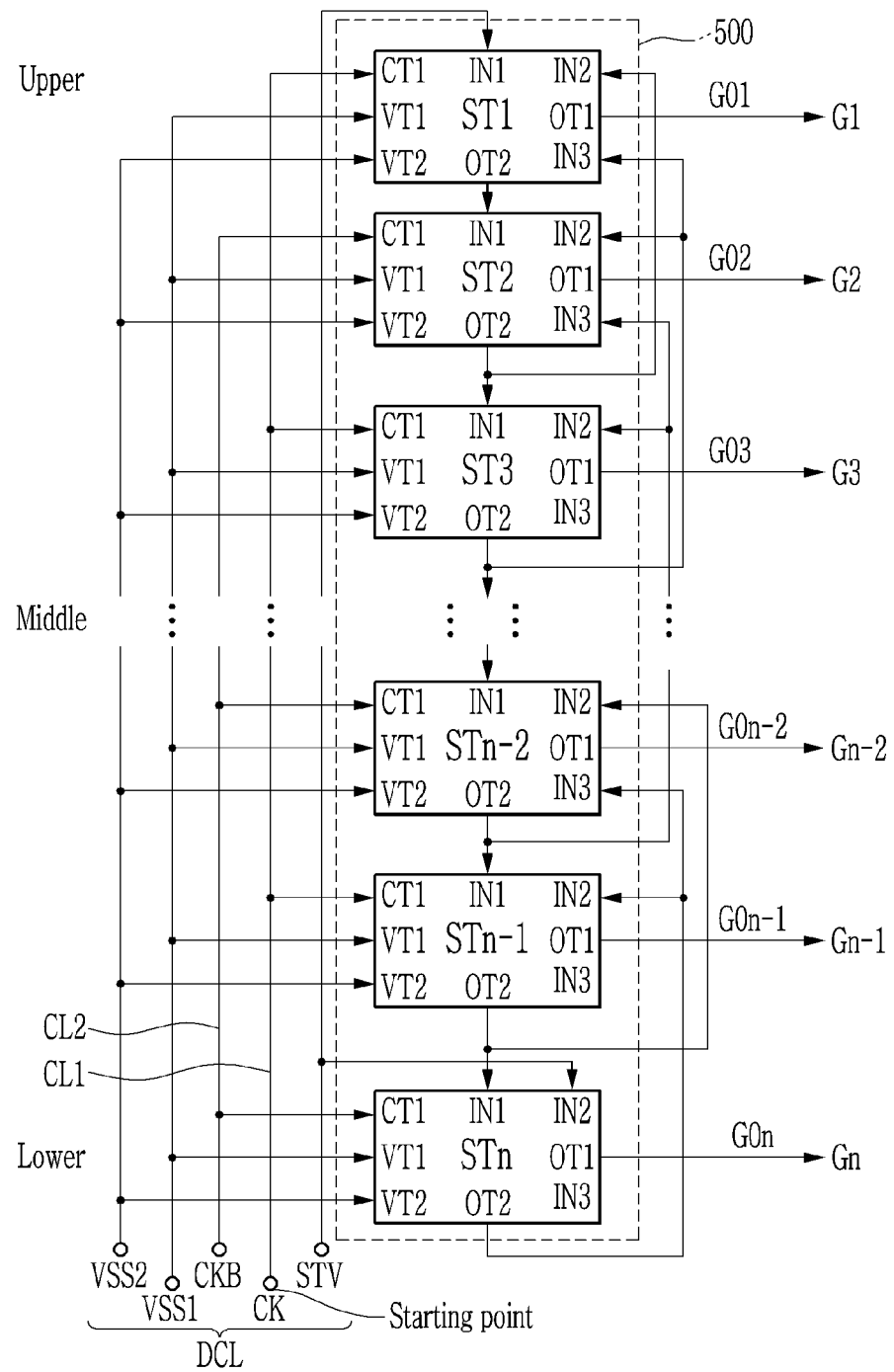
FIG. 2 shows a block diagram of a gate driver of FIG. 1 and signals input to and output from the same.

FIG. 2 shows a block diagram of a gate driver of FIG. 1 and signals input to and output from the same.

Referring to FIG. 2, the gate driver 500 includes a shift register including stages (ST1 . . . STn) connected to each other. The first to n-th stages (ST1 . . . STn) are connected to the first to n-th gate lines (G1 . . . Gn), respectively. The stages (ST1 . . . STn) may output n gate signals to the gate lines (G1 . . . Gn) in the order from the first stage ST1 to the n-th stage STn, or on the contrary, in order from the n-th stage STn to the first stage ST1.

Each stage includes a first clock signal terminal CT1, a first input terminal IN1, a second input terminal IN2, a third input terminal IN3, a first voltage terminal VT1, a second voltage terminal VT2, a first output terminal OT1, and a second output terminal OT2.

The first clock signal terminal CT1 may receive a first clock signal (CK) or a second clock signal (CKB) that is a phase-inverted signal of the first clock signal (CK). For example, the first clock signal terminal CT1 of the odd-numbered stages (ST1, ST3, . . . ) may receive the first clock signal (CK), and the first clock signal terminal CT1 of the even-numbered stages (ST2, ST4, . . . ) may receive the second clock signal (CKB). The first clock signal (CK) and the second clock signal (CKB) may be formed with a combination of high signals and low signals, and their duty ratio may be 50%.

The clock signals (CK, CKB) are transmitted through the first clock signal line CL1 and the second clock signal line CL2 among the driver control signal lines DCL, so the clock signals (CK, CKB) may experience an RC delay. The delay of the clock signals (CK, CKB) increases as they become distant from a starting point (corresponding to input ends of the clock signals (CK, CKB) of the display panel 300) of the clock signal lines CL1 and CL2 because of resistance of the clock signal lines CL1 and CL2. For example, referring to FIG. 1, the delay of the clock signals (CK, CKB) received by the stages (e.g., ST1) disposed distant from the starting point of the clock signal lines CL1 and CL2 is greater than the delay of the clock signals (CK, CKB) received by the stages (e.g., STn) disposed near the starting point of the clock signal lines CL1 and CL2. Accordingly, the delay of the gate signal output by the stage ST1 disposed at an upper portion of the display panel 300 may be the greatest, and the delay output by the stage STn disposed at a lower portion may be the smallest. The delay difference of the gate signals between the upper portion and the lower portion of the display panel 300 may become greater as the size and the resolution of the display panel 300 increase. In the present specification, a portion where the starting point of the clock signal lines CL1 and CL2 is disposed in the display panel 300 will be referred to as a lower portion, and a portion facing the lower portion will be referred to as an upper portion.

According to an exemplary embodiment, the delay of the gate signal may be reduced by gradually increasing the size (particularly a channel width) of a specific transistor (e.g., a second transistor T2 of FIG. 3 to be described) included in each stage as the stages (ST1 . . . STn) become distant from the starting point of the clock signal lines CL1 and CL2. Accordingly, the deviation of the delay of the gate signal depending on the position of the stages may be minimized, and the gate signals of all stages may show the substantially same output characteristic. The sizes of the stages (ST1 . . . STn) may gradually increase as they become distant from the starting point of the clock signal lines CL1 and CL2. This is because the region where the transistor is formed is increased to increase the size of the transistor, particularly, the channel width. According to another exemplary embodiment, the sizes of the stages (ST1 . . . STn) may be maintained by complementarily and gradually reducing the sizes of hold transistors (e.g., T3, T10, and T11 of FIG. 3) included in each stage. In this case, the sizes of the stages (ST1 . . . STn) may not be changed by allocating a same-size region to each of the stages (ST1 . . . STn), but allowing a different size (and a formed area) of the second transistor T2 that provides a large influence on the delay of the gate signal according to the position of the stage, and allowing a different size (and a formed area) of the hold transistor.

The first input terminal IN1 may be connected to the second output terminal OT2 of a previous stage to receive a first carry signal. The first stage ST1 may receive a start pulse vertical signal STV through the first input terminal IN1 since there is no previous stage.

The second input terminal IN2 may be connected to the second output terminal OT2 of the next stage to receive a carry signal. The last (n-th) stage may receive the start pulse vertical signal STV through the second input terminal IN2 since there is no next stage. The third input terminal IN3 may be connected to the second output terminal OT2 of the stage after the next stage to receive a second carry signal.

Differing from the exemplary embodiment shown in FIG. 2, the gate driver 500 may further include two dummy stages (not shown) so that the (n−1)-th stage STn−1 and the n-th stage STn may receive respective carry signals from the next stage and the stage after the next stage. Each of the dummy stages, differing from other stages (ST1–STn), generates a dummy gate voltage and outputs the same. The gate signals output by the other stages (ST1–STn) are transmitted through the gate lines (G1 . . . Gn) so that a data voltage may be applied to the pixels to display an image. However, the dummy stage may not be connected to any of the gate lines; instead, the dummy stage may be connected to the gate line of a dummy pixel (not shown) for displaying no image.

The first voltage terminal VT1 may receive a first low voltage (VSS1). The first low voltage (VSS1) has a first low level that may correspond to a discharging level of the gate signal. For example, the first low level may be about −6 V.

The second voltage terminal VT2 may receive a second low voltage (VSS2) having a second low level that is less than the first low level. The second low level corresponds to a discharging level of the first node Q included in the stage. For example, the second low level may be about −10 V.

The first output terminal OT1 is electrically connected to the corresponding gate line, and outputs a gate signal. The first output terminals OT1 of the first stage to the n-th stages (ST1 . . . STn) output first to n-th gate signals (GO1 . . . GOn). For example, the first output terminal OT1 of the first stage ST1 is electrically connected to the first gate line G1 to output a first gate signal GO1, and the first output terminal OT1 of the second stage ST2 is electrically connected to the second gate line G2 to output the second gate signal (GO2). The first gate signal GO1 may first be output, and the second gate signal GO2 may be output subsequent to the first gate signal GO1. The third gate signal (GO3) to the n-th gate signal (GOn) may be output subsequent to the second gate signal GO2.

The second output terminal OT2 may output a carry signal. The second output terminal OT2 of the (n−1)-the stage (STn−1) may be connected to the first input terminal IN1 of the n-th stage STn and the second input terminal IN2 of the (n−2)-th stage (STn−2). The second output terminal OT2 of the n-th stage STn may be connected to the second input terminal IN2 of the (n−1)-th stage STn−1 and the third input terminal IN3 of the (n−2)-th stage STn−2.

The connection structure of the stages (ST1 . . . STn) of the gate driver 500 has been described with reference to FIG.

2. A structure of one stage connected to one gate line will be described in detail with reference to FIG. 3 to FIG. 6 in addition to FIG. 1 and FIG. 2.

Figure 3:
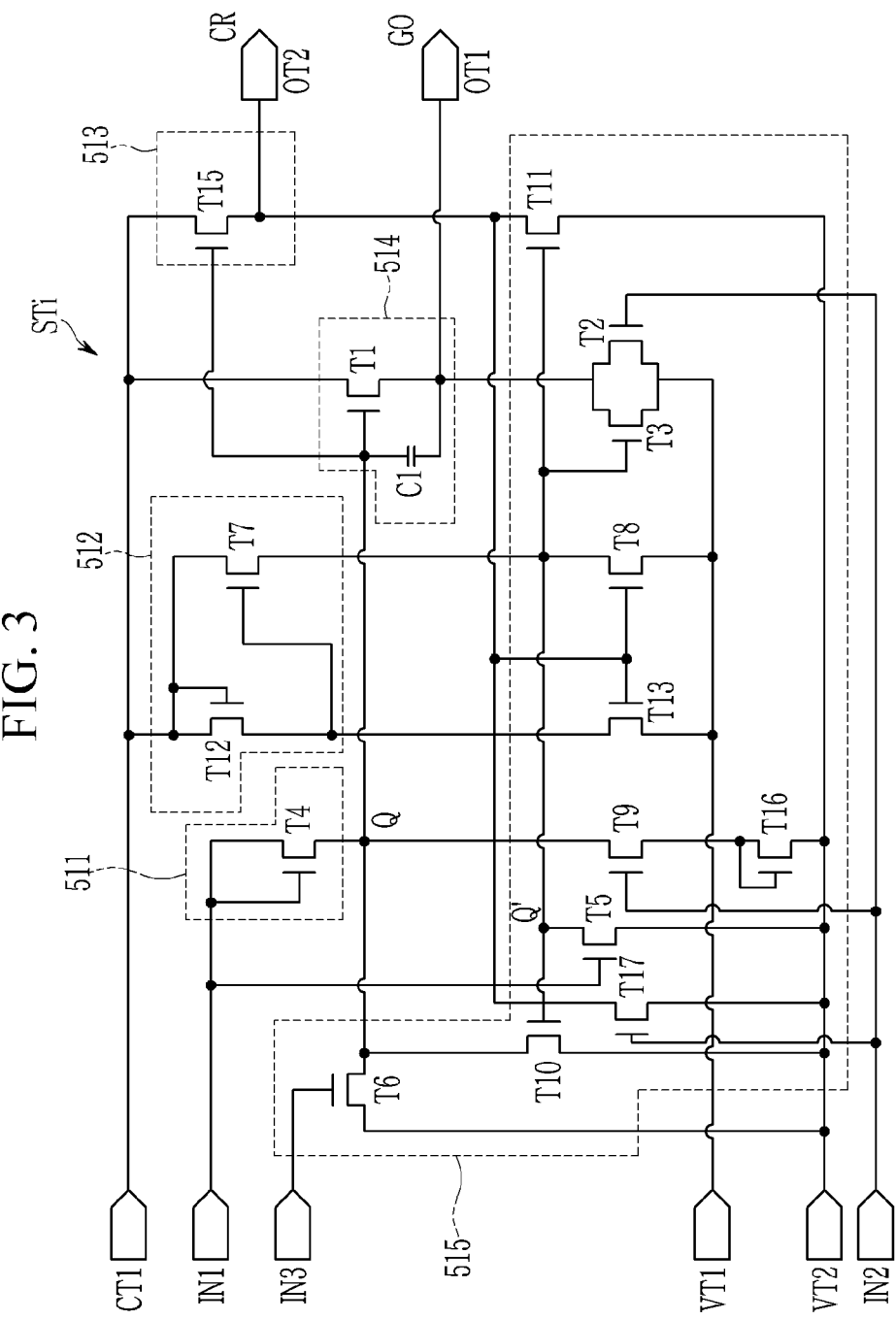
FIG. 3 shows a circuit diagram of one stage of a gate driver according to an exemplary embodiment of the present disclosure.
Figure 4:
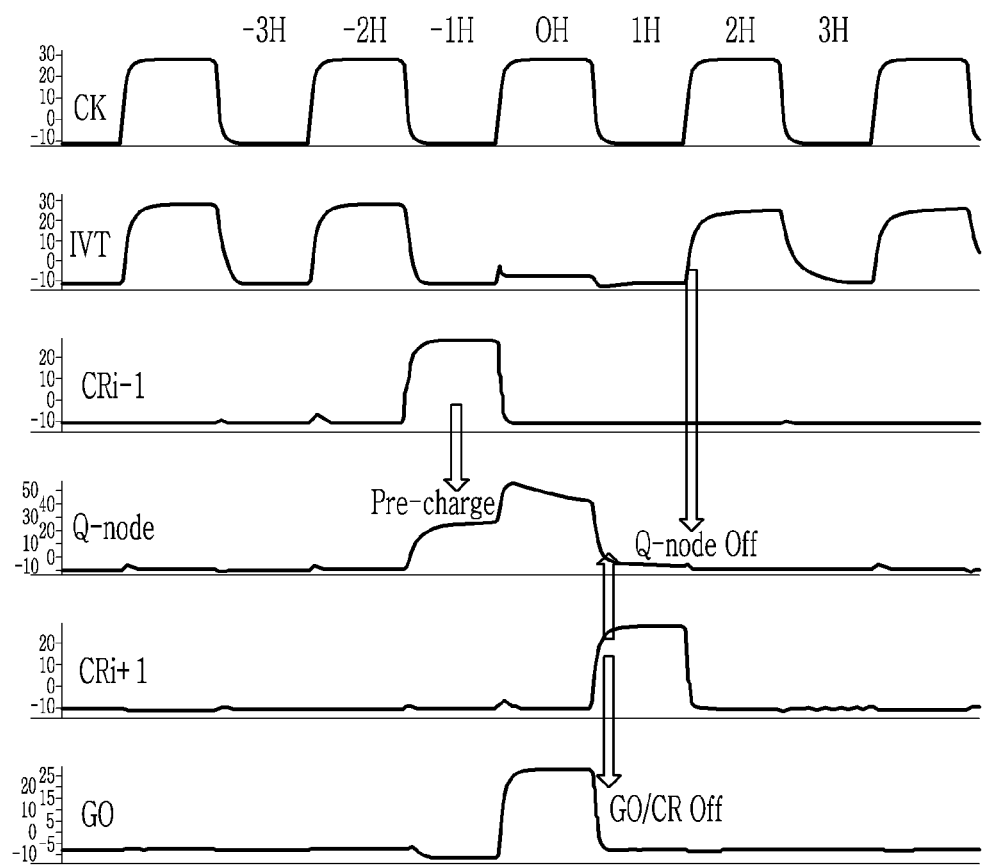
FIG. 4 shows a waveform diagram of major signals used on one stage of a gate driver according to an exemplary embodiment of the present disclosure.
Figure 5:
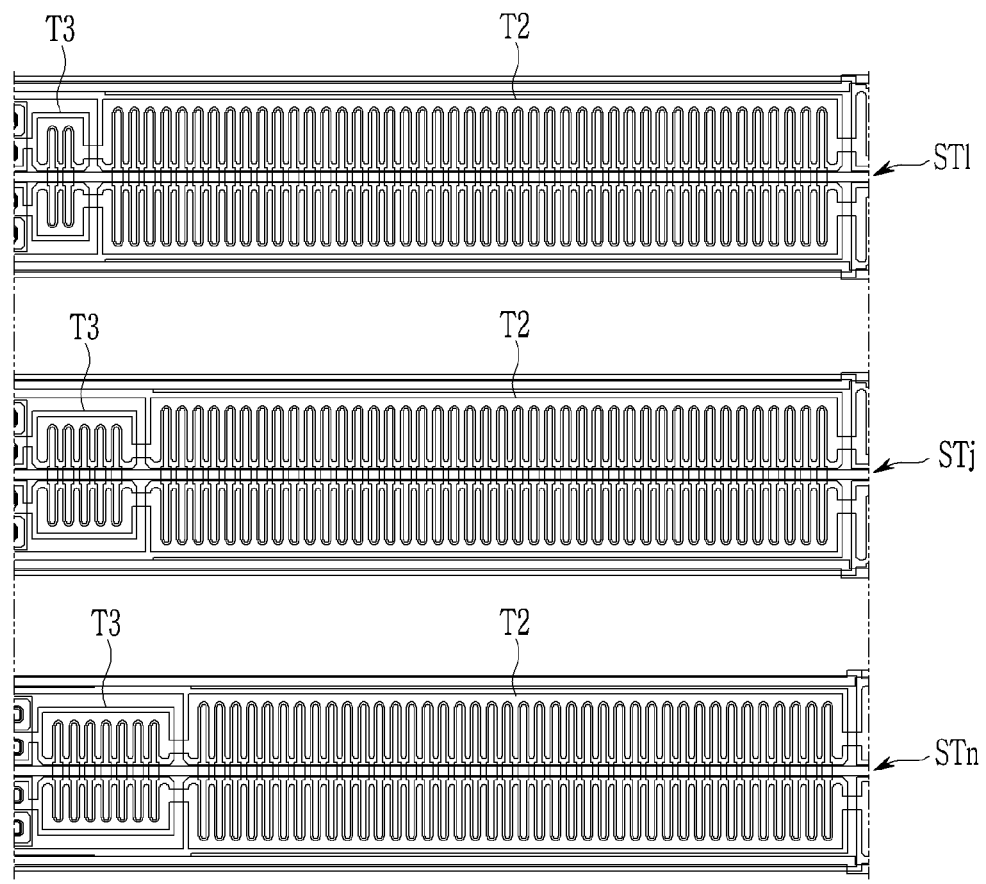
FIG. 5 shows a partially enlarged view of several stages of a gate driver according to an exemplary embodiment of the present disclosure.
Figure 6:
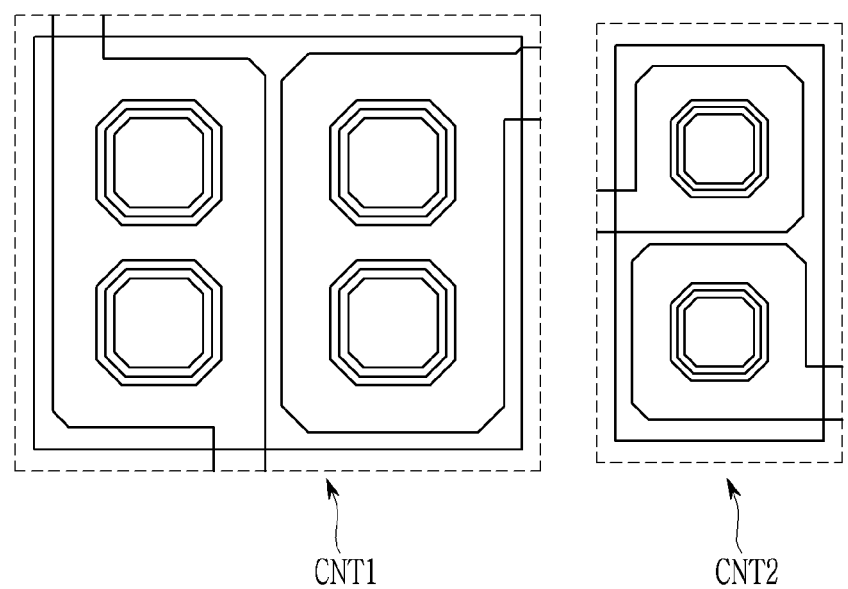
FIG. 6 shows a partially enlarged view of several contact portions of a gate driver according to an exemplary embodiment of the present disclosure.

FIG. 3 shows a circuit diagram of one stage of a gate driver according to an exemplary embodiment of the present disclosure, and FIG. 4 shows a waveform diagram of major signals used on one stage of a gate driver according to an exemplary embodiment of the present disclosure. FIG. 5 shows a partially enlarged view of several stages of a gate driver according to an exemplary embodiment of the present disclosure, and FIG. 6 shows a partially enlarged view of several contact portions of a gate driver according to an exemplary embodiment of the present disclosure.

Referring to FIG. 3, the stage STi includes an input section 511, a pull-up driver 512, a carry signal generator 513, an output unit 514, and a pull-down driver 515. FIG. 4 shows waveforms of signals used in the stage STi, wherein a horizontal direction is a time axis, 0H represents a section for outputting a gate-on voltage in the present stage STi, and the time axis increases by 1 horizontal period 1H as it goes to the right with reference to 0H. The waveforms indicate the clock signal (CK) input to the present stage STi, an inverter signal IVT of the present stage STi, a carry signal (CRi−1) of the previous stage (STi−1), a voltage at the first node Q of the present stage STi, a carry signal (CRi+1) of the next stage (STi+1), and a gate signal (GO) of the present stage STi.

Referring to FIG. 3, the input section 511 includes a fourth transistor T4. A first electrode and a control electrode of the fourth transistor T4 are connected in common (diode-connected) to the first input terminal IN1, and the second electrode is connected to the first node Q. The input section 511 functions to transmit the carry signal (CR) of the previous stage (STi−1) received from the first input terminal IN1 to the first node Q. The input section 511 may also be referred to as a buffer.

The pull-up driver 512 includes a seventh transistor T7 and a twelfth transistor T12. The control electrode and the first electrode of the twelfth transistor T12 is commonly connected to receive the first clock signal (CK) or the second clock signal (CKB) through the first clock signal terminal CT1, and the second electrode is connected to the control electrode of the seventh transistor T7 and the pull-down driver 515. A first electrode of the seventh transistor T7 is connected to the first clock signal terminal CT1, the second electrode is connected to a second node Q' and the pull-down driver 515, and the control electrode connected to the second electrode of the twelfth transistor T12 and the pull-down driver 515. A parasitic capacitor may be respectively formed between the first electrode and the control electrode of the seventh transistor T7 and between the control electrode and the second electrode of the seventh transistor T7. When a high signal is applied to the first clock signal terminal CT1, the high signal is transmitted to the control electrode of the seventh transistor T7 and the pull-down driver 515 through the twelfth transistor T12 of the pull-up driver 512. The high signal transmitted to the seventh transistor T7 turns on the seventh transistor T7, and as a result, the high signal applied by the first clock signal terminal CT1 is applied to the second node Q'. The signal of the second node Q' may be an inverter signal (IVT), and it may be transmitted to the next stage (STi+1) through a third output terminal (not shown).

The carry signal generator 513 includes a fifteenth transistor T15. The fifteenth transistor T15 includes a first electrode connected to the first clock signal terminal CT1 to receive the first clock signal (CK) or the second clock signal (CKB), a control electrode connected to a first node Q that is an output of the input section 511, and a second electrode connected to the second output terminal OT2 for outputting the carry signal (CR). A parasitic capacitor may be formed between the control electrode and the second electrode of the fifteenth transistor T15. The second electrode of the fifteenth transistor T15 is connected to the pull-down driver 515 as well as the second output terminal OT2 to receive a second low voltage (VSS2). When the carry signal (CR) is low, the voltage at the second output terminal OT2 is a second low voltage (VSS2).

The output unit 514 includes a first transistor T1 and a first capacitor C1. The first transistor T1 includes a control electrode connected to the first node Q, a first electrode for receiving a first clock signal (CK) or a second clock signal (CKB) through the first clock signal terminal CT1, and a second electrode connected to the first output terminal OT1 for outputting a gate signal (GO). The first capacitor C1 is formed between the control electrode and the second electrode of the first transistor T1, and stores the voltage at the first node Q. The output unit 514 outputs the gate signal (GO) according to the voltage at the first node Q and the clock signal CK or CKB. For example, at the stage STi, when the carry signal (CR) of the previous stage (STi−1) is applied to the first node Q for the period of −1H, a high voltage is stored in the first capacitor C1 (precharging), and the clock signal CK (or CKB) is changed to High from Low through the first clock signal terminal CT1 for the period of 0H, the voltage at the first node Q that is the control electrode of the first transistor T1 is boosted up, and the gate-on voltage is output to the first output terminal OT1. The second electrode of the first transistor T1 is connected to the pull-down driver 515 to receive the first low voltage (VSS1). A gate-off voltage of the gate signal (GO) has a first low voltage (VSS1).

The pull-down driver 515 is a unit for allowing the gate-off voltage and the low voltage of the carry signal (CR) to be freely output by removing charges present in the stage STi. The pull-down driver 515 reduces a potential of the first node Q and a potential of the second node Q' (inverter signal), reduces a voltage of the carry signal (CR) that is output through the second output terminal OT2, and reduces the voltage of the gate signal (GO) that is output to the gate line through the first output terminal OT1. The pull-down driver 515 reduces the voltage at the first output terminal OT1 to the first low voltage (VSS1), and reduces the voltage at the first node Q, the second node Q', and the second output terminal OT2 to a second low voltage (VSS2) that is less than the first low voltage (VSS1). As a result, the gate-on voltage and the voltage of the carry signal (CR) at High may have a same voltage, and the gate-off voltage and the voltage of the carry signal (CR) at Low may have different voltage values. The pull-down driver 515 may include a second transistor T2, a third transistor T3, a fifth transistor T5, a sixth transistor T6, an eighth transistor T8, a ninth transistor T9, a tenth transistor T10, an eleventh transistor T11, a thirteenth transistor T13, a sixteenth transistor T16, and a seventeenth transistor T17.

First, transistors in the pull-down driver 515 used for pulling down the first node Q will be described. The transistors for pulling down the first node Q include a sixth transistor T6, a ninth transistor T9, a tenth transistor T10, and a sixteenth transistor T16.

The sixth transistor T6 includes a control electrode connected to the third input terminal IN3 to receive a carry signal (CR) of the stage (STi+2) after the next stage, a second electrode connected to the second voltage terminal VT2 to receive the second low voltage (VSS2), and a first electrode connected to the first node Q. The sixth transistor T6 is turned on according to the carry signal (CR) of the stage (STi+2) after the next stage to reduce the voltage at the first node Q to the second low voltage (VSS2).

The ninth transistor T9 and the sixteenth transistor T16 are used to pull down the voltage of the first node Q. The ninth transistor T9 includes a control electrode connected to the second input terminal IN2 to receive a carry signal (CR) of the next stage (STi+1), a first electrode connected to the first node Q, and a second electrode connected to a first electrode and a control electrode of the sixteenth transistor T16 that are connected (diode-connected) to the second electrode of the ninth transistor T9. A second electrode of the sixteenth transistor T16 is connected to the second voltage terminal VT2 to receive the second low voltage (VSS2). The ninth transistor T9 and the sixteenth transistor T16 are turned on by the carry signal (CR) applied by the next stage (STi+1) to reduce the voltage at the first node Q to the second low voltage (VSS2).

The tenth transistor T10 includes a first electrode connected to the first node Q, a second electrode connected to the second voltage terminal VT2 to receive the second low voltage (VSS2), and a control electrode connected to the second node Q' to receive an inverter signal (IVT) of the present stage. Therefore, the tenth transistor T10 maintains the voltage of the first node Q at the second low voltage (VSS2) during a period in which the inverter signal (IVT) of the second node Q' has a high voltage, and the tenth transistor T10 does not maintain the voltage at the first node Q when the voltage at the second node Q' is Low. When the voltage at the first node Q is not maintained, the corresponding stage STi outputs a gate-on voltage and a carry signal (CR). Because the tenth transistor T10 maintains the voltage of the first node Q at the second low voltage (VSS2) and stabilizes the same, the tenth transistor T10 may be referred to as a hold transistor.

Transistors in the pull-down driver 515 used for pulling down the second node Q' (inverter signal) will now be described. The transistors for pulling down the second node Q' include a fifth transistor T5, an eighth transistor T8, and a thirteenth transistor T13.

The fifth transistor T5 includes a control electrode connected to the first input terminal IN1, a first electrode connected to the second node Q', and a second electrode connected to the second voltage terminal VT2. The fifth transistor T5 reduces the voltage at the second node Q' to the second low voltage (VSS2) according to the carry signal (CR) of the previous stage (STi−1).

The eighth transistor T8 includes a control electrode connected to the second output terminal OT2, a first electrode connected to the second node Q', and a second electrode connected to the first voltage terminal VT1. The eighth transistor T8 reduces the voltage at the second node Q' to the first low voltage (VSS1) according to the carry signal (CR) of the present stage STi.

The thirteenth transistor T13 includes a control electrode connected to the second output terminal OT2, a first electrode connected to the second electrode of the twelfth transistor T12 of the pull-up driver 512, and a second electrode connected to the first voltage terminal VT1. The thirteenth transistor T13 reduces a potential inside the pull-up driver 512 to the first low voltage (VSS1) according to the carry signal (CR) of the present stage STi, and reduces the voltage at the second node Q' connected to the pull-up driver 512 to the first low voltage (VSS1).

Transistors in the pull-down driver 515 used for reducing the voltage output to the carry signal (CR) will now be described. The transistors for reducing the voltage output to the carry signal (CR) include an eleventh transistor T11 and a seventeenth transistor T17.

The eleventh transistor T11 includes a control electrode connected to the second node Q', a first electrode connected to the second output terminal OT2, and a second electrode connected to the second voltage terminal VT2. The eleventh transistor T11 reduces the voltage of the carry signal (CR) at the second output terminal OT2 to the second low voltage (VSS2) when the voltage at the second node Q' is High. Because the eleventh transistor T11 maintains the voltage of the carry signal (CR) at the second output terminal OT2 at the second low voltage (VSS2), the eleventh transistor T11 may be referred to as a hold transistor.

The seventeenth transistor T17 includes a control electrode connected to the second input terminal IN2, a first electrode connected to the second output terminal OT2, and a second electrode connected to the second voltage terminal VT2. The seventeenth transistor T17 reduces the voltage of the carry signal (CR) at the second output terminal OT2 to the second low voltage (VSS2) according to the carry signal (CR) of the next stage (STi+1). The seventeenth transistor T17 may operate based on the carry signal (CR) of the next stage (STi+1) to support the operation of the eleventh transistor T11.

Transistors for reducing the voltage output to the gate line in the pull-down driver 515 include a second transistor T2 and a third transistor T3.

The second transistor T2 includes a control electrode connected to the second input terminal IN2, a first electrode connected to the first output terminal OT1, and a second electrode connected to the first voltage terminal VT1. The second transistor T2 reduces the gate signal (GO) at the first output terminal OT1 to the first low voltage (VSS1) when the carry signal (CR) of the next stage (STi+1) is applied. Therefore, the second transistor T2 substantially influences a delay (particularly a falling time) of the gate signal (GO).

When the size of the second transistor T2 is large, an amount of current flowing to the second transistor T2 increases, so the voltage may quickly reach a desired voltage. Therefore, it is advantageous in improving the delay of the gate signal to use a large second transistor T2. As described above, the gate signals output by the stages that are distant from the starting point of the clock signal lines CL1 and CL2 may show a larger delay. The second transistor T2 of the stage that is disposed near the starting point of the clock signal lines CL1 and CL2 is implemented to be relatively small and the second transistor T2 of the stage that is disposed distant from the starting point of the clock signal lines CL1 and CL2 is implemented to be relatively large, thereby reducing the delay deviation of the gate signals according to the position of the stages. The size of the second transistor T2 may be gradually increased for each stage from the first stage ST1 to the n-th stage STn, or for each stage group including a plurality of stages. In the latter case, the number of stages included in the respective stage groups may be same or different.

For example, referring to FIG. 5, the second transistor T2 of the n-th stage STn that is disposed nearest the starting point of the clock signal lines CL1 and CL2 corresponding to input ends of the clock signals (CK, CKB) may be the smallest, the second transistor T2 of the j-th stage STj that is disposed distant from the starting point may be larger, and the second transistor T2 of the first stage ST1 that is disposed farthest from the starting point may be the largest. When the first stage ST1 is disposed nearest the starting point of the clock signal lines CL1 and CL2, the second transistor T2 of the first stage ST1 is the smallest, and the second transistors T2 may gradually become larger as the distance of corresponding stages from the starting point increases.

The third transistor T3 includes a control electrode connected to the second node Q', a first electrode connected to the first output terminal OT1, and a second electrode connected to the first voltage terminal VT1. Because the third transistor T3 maintains the gate signal (GO) at the first low voltage (VSS1) when the voltage at the second node Q' is High, the third transistor T3 may be referred to as a hold transistor.

In the pull-down driver 515, the third transistor T3, the tenth transistor T10, and the eleventh transistor T11 represent hold transistors for stabilizing the voltages of the output terminals OT1 and OT2 and the first node Q to achieve the driving reliability. When the hold transistors are large (e.g., a large channel width), it may be advantageous in controlling generation of ripples that can cause high-temperature noise defects. For example, when a ripple is generated at the first node Q when the temperature rises, leakage of the first transistor T1 increases. Further, a voltage-off level of the first node Q may increase to increase leakage of the fifteenth transistor T15, so the voltage at the first node Q is boosted up to show a high-temperature noise defect that outputs a gate-on voltage after an intended timing. However, the ripple of the first node Q causing a high-temperature noise defect starts at the stage (e.g., the first stage ST1 disposed at an upper portion of the display panel 300 in FIG. 1) where the gate signal output is started, and it gradually increases as the stages increase (e.g., as the stage goes to the n-th stage STn disposed at the lower portion of the display panel 300 in FIG. 1). In addition, a skew of waveforms of the clock signals (CK, CKB) becomes larger toward the lower portion of the display panel 300, so the stages disposed at the lower portion may be more sensitive to the ripple. Therefore, the hold transistors for preventing the high-temperature noise defect may be implemented to be larger as the stages are closer to the lower portion of the display panel 300. The starting stage ST1 that is farthest from the starting point of the clock signal lines CL1 and CL2 may have the smallest transistor T3.

For example, referring to FIG. 5, the third transistor T3 is the smallest at the first stage ST1, it becomes gradually larger as the stages get closer to the lower portion of the display panel 300, and the third transistor T3 may be the largest at the n-th stage STn. Although only the third transistor T3 is illustrated in FIG. 5, other hold transistors such as the tenth transistor T10 and the eleventh transistor T11 may also be implemented in a like manner. That is, the size of at least one of the third transistor T3, the tenth transistor T10, and the eleventh transistor T11 may be gradually changed, and for example, it may be gradually increased toward the lower portion of the display panel 300 from the upper portion of the display panel 300.

When the size of the second transistor T2 is gradually increased as the corresponding stage becomes distant from the starting point of the clock signal lines CL1 and CL2, a region corresponding to the increasing size of the second transistor T2 may need be acquired, which may cause the increase of the entire size of the gate driver 500 integrated in the display panel 300 and may resultantly increase the size of the bezel. According to an exemplary embodiment, the sizes of the stages (ST1 . . . STn) may be substantially the same by complementarily and gradually reducing the size of the at least one hold transistor while gradually increasing the size of the second transistor T2, so the delay of the gate signal may be reduced without increasing the size of the gate driver 500.

Referring to FIG. 1, the delay of the clock signal is reduced toward the lower portion of the display panel 300, and the high-temperature margin may be acquired by gradually reducing the size of the second transistor T2 and gradually increasing the sizes of the hold transistors (T3, T10, and T11). The increase/reduction of sizes of the second transistors T2 and the increase/reduction of sizes of the hold transistors may be mutually complementary so that the sizes of the stages (ST1 . . . STn) may be kept substantially the same.

Together with the change of the sizes of the hold transistors or independently, the size of the first capacitor C1 (particularly, the area thereof) may be reduced to increase the size of the second transistor T2 in the stages disposed at the upper portion of the display panel 300 that is distant from the starting point of the clock signal lines CL1 and CL2, and the size may be increased to improve reliability toward the lower portion of the display panel 300. Therefore, the increase/reduction of the sizes of the first capacitors Cl may be complementary to the increase/reduction of the sizes of the second transistors T2.

When the gate driver 500 may be sensitive to a low-temperature defect, the stages (ST1 . . . STn) may be implemented in a similar manner as described above. The low-temperature defect represents a phenomenon that the output is deteriorated as the stages increase (e.g., toward the lower portion of the display panel 300), and the first transistor T1, the first capacitor C1, and the fifteenth transistor T15 may play a significant role. As the stages increase (e.g., as it goes to the lower portion of the display panel 300), a low-temperature margin may be acquired by reducing the size of the first capacitor C1 and increasing the size of the first transistor T1 and/or the fifteenth transistor T15.

Regarding the improvement of the delay of the gate signal through the second transistor T2, it may be considered to increase the amount of current by changing the size of the contact region corresponding to the second transistor T2. For example, the first electrode, the second electrode, and/or the control electrode of the second transistor T2 may be electrically connected to another element of the stage STi through a contact hole formed in an insulating layer to receive a signal. In this instance, as the contact region becomes larger, contact resistance is reduced and the amount of current increases, so the gate signal may quickly reach a predetermined voltage level (e.g., VSS1) thereby reducing the delay of the gate signal. Referring to FIG. 6, the delay of the gate signal may be reduced by forming a large contact region CNT1 of the second transistor T2 in the stages disposed at the upper portion of the display panel 300 and forming a small contact region CNT2 of the second transistor T2 of the stage disposed at the lower portion of the display panel 300. The change of the size of the contact region may be gradually implemented according to the position of the stages. The change of the size of the contact region may be applied together with the above-noted change of the size of the second transistor T2, or independently. Additionally, the delay of the gate signal that can be different depending on the position of the stages may be reduced by gradually changing the amount of current by gradually changing the wire resistance of the stages.

Figure 7:
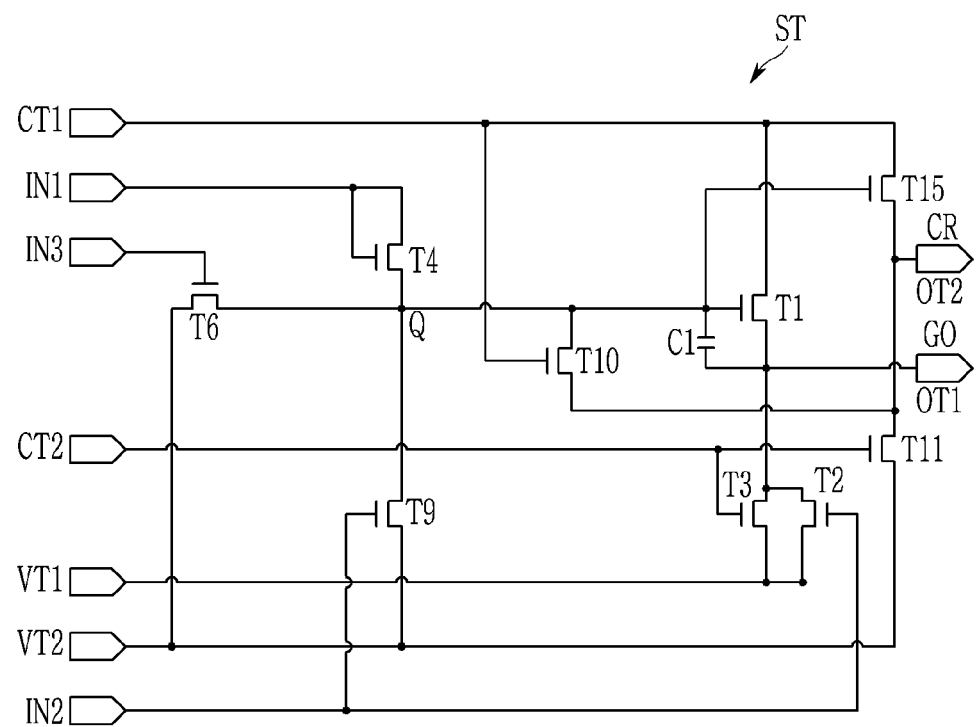
FIG. 7 and FIG. 8 respectively show a circuit diagram of one stage of a gate driver according to an exemplary embodiment of the present disclosure.
Figure 8:
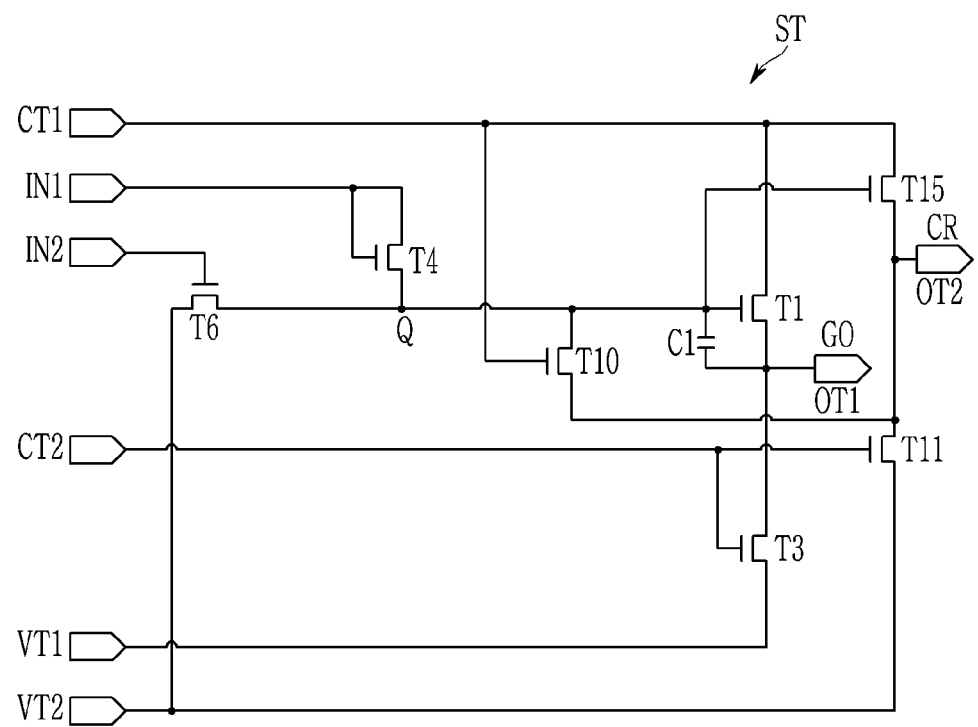

The above-described stage STi is exemplary, the stage STi may not include some of the described transistors or may be configured to include additional transistors, and the number and/or type of the input and output terminals may be changed. For example, the stage STi may include nine transistors and one capacitor as shown in FIG. 7, or seven transistors and one capacitor as shown in FIG. 8. The exemplary stages STi shown in FIG. 7 and FIG. 8 may include two clock signal terminals CT1 and CT2 and may receive first and second clock signals (CK, CKB). The transistors with the same reference numerals as those of FIG. 3 in FIG. 7 and FIG. 8 may perform substantially the same functions, and the input/output terminals with the same reference numerals may input and output substantially the same signals as the described ones. Therefore, the gradual change of the sizes of specific transistors and capacitors described in connection with the exemplary embodiment shown in FIG. 3 may be equally applied to the gate driver including the stage STi shown in FIG. 7 and FIG. 8.

While the present disclosure has been described in connection with what is presently considered to be practical exemplary embodiments, it is to be understood that the present disclosure is not limited to the disclosed embodiments, but, on the contrary, is intended to cover various modifications and equivalent arrangements included within the spirit and scope of the present disclosure.

What is claimed is:

1. A display device comprising:
a display panel in which a plurality of pixels are arranged;
a plurality of gate lines disposed in the display panel and transmitting a gate signal to the plurality of pixels;
a gate driver disposed in the display panel and including a plurality of stages for generating the gate signal and outputting the gate signal to the plurality of gate lines; and
a plurality of clock signal lines disposed in the display panel and transmitting a clock signal to the plurality of stages,
wherein each stage of the plurality of stages includes a clock signal terminal connected to one of the plurality of clock signal lines to receive the clock signal, a first output terminal connected to a corresponding gate line to output the gate signal, and a first transistor and a second transistor connected to the first output terminal,
each of the plurality of stages has a substantially same area, and
a size of the second transistor of each stage of the plurality of stages varies based on a distance from a starting point of the one of the plurality of clock signal lines to the clock signal terminal.

2. The display device of claim 1, wherein
each stage further includes a first input terminal for receiving a carry signal of a previous stage, a second input terminal for receiving a carry signal of a next stage, and a first voltage terminal for receiving a first low voltage, and
the second transistor includes a first electrode connected to the first output terminal, a second electrode connected to the first voltage terminal, and a control electrode connected to the second input terminal.

3. The display device of claim 2, wherein
the first transistor includes a first electrode connected to the clock signal terminal, a second electrode connected to the first output terminal, and a control electrode connected to a first node.

4. The display device of claim 3, wherein
starting points of the plurality of clock signal lines are positioned at a lower portion of the display panel, and the clock signal is input to the display panel through the starting points of the plurality of clock signal lines.

5. The display device of claim 4, wherein
the size of the second transistor of a first stage disposed at an upper portion of the display panel is larger than the size of the second transistor of a second stage disposed at the lower portion of the display panel.

6. The display device of claim 5, wherein
a size of the second transistor of each stage of the plurality of stages gradually increases from the lower portion of the display panel to the upper portion of the display panel.

7. The display device of claim 5, wherein
each stage further includes a third transistor including a first electrode connected to the first output terminal, a second electrode connected to the first voltage terminal, and a control electrode connected to a second node, and
a size of the third transistor of the first stage disposed at the upper portion of the display panel is different from a size of the third transistor of the second stage disposed at the lower portion of the display panel.

8. The display device of claim 7, wherein
a size of the third transistor of each stage of the plurality of stages gradually decreases from the lower portion of the display panel to the upper portion of the display panel.

9. The display device of claim 5, wherein
each stage further includes:
a second voltage terminal for receiving a second low voltage; and
a tenth transistor including a first electrode connected to the first node, a second electrode connected to the second voltage terminal, and a control electrode connected to a second node, and
a size of the tenth transistor of a first stage disposed at the upper portion of the display panel is different from a size of the tenth transistor of the second stage disposed at the lower portion of the display panel.

10. The display device of claim 9, wherein
a size of the tenth transistor of each stage of the plurality of stages gradually decreases from the lower portion of the display panel to the upper portion of the display panel.

11. The display device of claim 4, wherein
each stage further includes a second output terminal for outputting a carry signal, and an eleventh transistor connected to the second output terminal, and
a size of the eleventh transistor of a first stage disposed at an upper portion of the display panel is different from a size of the eleventh transistor of a second stage disposed at the lower portion of the display panel.

12. The display device of claim 11, wherein
each stage further includes a second voltage terminal for receiving a second low voltage,
the eleventh transistor includes a first electrode connected to the second output terminal, a second electrode connected to the second voltage terminal, and a control electrode connected to a second node, and
a size of the eleventh transistor of each stage of the plurality of stages gradually decreases from the lower portion of the display panel to the upper portion of the display panel.

13. The display device of claim 11, wherein
each stage further includes a fifteenth transistor including a first electrode connected to the clock signal terminal, a second electrode connected to the second output terminal, and a control electrode connected to the first node, and a size of at least one of the first transistor and the fifteenth transistor of each stage of the plurality of stages gradually increases from the upper portion of the display panel to the lower portion of the display panel.

14. The display device of claim 6, wherein
each stage further includes a first capacitor connected between a control electrode and a second electrode of the first transistor, and
a size of the first capacitor of each stage of the plurality of stages gradually decreases from the lower portion of the display panel to the upper portion of the display panel.

15. A display device comprising:
a display panel including a display area in which a plurality of pixels and a plurality of gate lines are disposed, and a non-display area adjacent to the display area;
a gate driver disposed in the non-display area and including a plurality of stages connected to each other and respectively connected to the plurality of gate lines; and
a plurality of clock signal lines for transmitting a clock signal to the plurality of stages,
wherein each stage includes an output unit including a first transistor that outputs a gate signal, and a pull-down driver including a second transistor that lowers the gate signal to a first low voltage, and
a size of the second transistor of each stage of the plurality of stages gradually increases from a first end portion of the display panel to a second end portion of the display panel.

16. The display device of claim 15, wherein
the second transistor includes a first electrode connected to an output terminal of the gate signal, a second electrode connected to a first input terminal of the first low voltage, and a control electrode connected to a second input terminal of a carry signal of a next stage.

17. The display device of claim 16, wherein
the pull-down driver further includes a third transistor for maintaining the gate signal at the first low voltage, and
a size of the third transistor of each stage of the plurality of stages gradually decreases from the first end portion the display panel to the second end portion of the display panel.

18. The display device of claim 17, wherein
the third transistor includes a first electrode connected to the output terminal of the gate signal, a second electrode connected to the first input terminal of the first low voltage, and a control electrode connected to a second node.

19. The display device of claim 15, wherein
the first transistor includes a control electrode connected to a first node,
the pull-down driver further includes a tenth transistor for maintaining the first node at a second low voltage, and
a size of the tenth transistor of each stage of the plurality of stages gradually decreases from the first end portion of the display panel to the second end portion of the display panel.

20. The display device of claim 15, wherein
each stage further includes a carry signal generator for outputting a carry signal,
the pull-down driver further includes an eleventh transistor for maintaining an output terminal of the carry signal at a second low voltage, and
a size of the eleventh transistor of each stage of the plurality of stages gradually decreases from the first end portion of the display panel to the second end portion of the display panel.

* * * * *